US005473428A

United States Patent [19]
Lee et al.

[11] Patent Number: 5,473,428
[45] Date of Patent: Dec. 5, 1995

[54] INTERFEROMETRIC TEMPERATURE SENSING SYSTEM HAVING A COUPLED LASER DIODE WHEREIN THE MAGNITUDE IS ADJUSTED CORRESPONDING TO A PRIOR FEED-BACK LASER BEAM

[75] Inventors: Kyung-Shik Lee; Yun-Hae Yeh, both of Kyungki, Rep. of Korea

[73] Assignee: SamSung Electronics Co., Ltd., Kyungki-do, Rep. of Korea

[21] Appl. No.: 350,135

[22] Filed: Nov. 29, 1994

[30] Foreign Application Priority Data

Dec. 31, 1993 [KR] Rep. of Korea ............... 31806/1993

[51] Int. Cl.$^6$ ................................. G01B 9/02
[52] U.S. Cl. .................... 356/345; 374/131; 374/162; 356/43; 356/44
[58] Field of Search ................... 356/43, 44, 345, 356/350, 352; 374/130, 131, 160, 162

[56] References Cited

U.S. PATENT DOCUMENTS

| | | |
|---|---|---|
| 4,594,003 | 6/1986 | Sommargren . |
| 4,842,409 | 6/1989 | Arditty et al. ............... 356/350 |
| 4,848,906 | 7/1989 | Layton . |
| 4,868,381 | 9/1989 | Davis . |
| 4,918,492 | 4/1990 | Ferinand . |
| 4,928,007 | 5/1990 | Furstenau . |
| 5,172,185 | 12/1992 | Leuchs . |
| 5,202,939 | 4/1993 | Bellevile . |
| 5,276,501 | 1/1994 | McClintock et al. ............... 356/352 |
| 5,319,725 | 1/1994 | Buchmann . |
| 5,381,229 | 1/1995 | Murphy et al. ............... 356/345 |

Primary Examiner—Samuel A. Turner
Assistant Examiner—Robert Kim
Attorney, Agent, or Firm—Robert E. Bushnell

[57] ABSTRACT

An interferometric temperature sensing system provides a simplified design for accurately processing an interference fringe pattern using self coupling effects of a laser detection element, where a laser diode and an optical detection element are combined in one package. Accordingly, the present invention is easily made and the measurement of temperatures within a wide range can be easily performed. The interferometric temperature sensing system contemplates an interferometric sensor having one or more reflecting surfaces and different optical paths corresponding to a temperature of a measured object or environment; a laser detection element for emitting a first laser beam in response to a predetermined modulated driving signal and adjusting the amount of the emitted first laser beam corresponding to a second laser beam, the laser detection element also detects the magnitude of an adjusted third laser beam to generate a sense signal that includes temperature information; an optical coupler for propagating the emitted first laser beam to a proximal end of the interferometric sensor, coupling the laser beams fed back through the proximal end of the interferometric sensor into the second laser beam, and then propagating the coupled beam to the laser detection element; a modulated signal generator for generating the modulated driving signal in response to a predetermined pilot signal; and a temperature processor for generating the pilot signal, and detecting a temperature change direction and a fringe number of the sense signal to calculate a temperature change.

38 Claims, 6 Drawing Sheets

INTERFEROMETRIC TEMPERATURE SENSING SYSTEM HAVING A COUPLED LASER DIODE WHEREIN THE MAGNITUDE IS ADJUSTED CORRESPONDING TO A PRIOR FEED-BACK LASER BEAM

CROSS-REFERENCE TO RELATED APPLICATIONS

This application makes reference to, incorporates herein, and claims all benefits available under 35 U.S.C. §119 through our earlier filing of a patent application for Interferometric Temperature Sensing System Having A Coupled Laser Diode filed in The Korea Industrial Property Office on 31 Dec. 1993 and assigned Ser. No. 1993/31806.

BACKGROUND OF THE INVENTION

The present invention relates to a temperature sensing system, and more particularly to an interferometric temperature sensing system that uses a laser detection element to measure a temperature by detecting changes in an interference fringe pattern indicative of changes in external temperature.

A thermocouple or resistive temperature detector (i.e., RTD) is typically used for general methods of electrically measuring the temperature of heat-emitting objects, objects within a hot environment or an ambient temperature of a hot (i.e., beyond room temperature) environment. Temperature measuring meters using such above methods have problems however, with electromagnetic interference (EMI), accuracy, response speed, and resolution. Also, there is a problem in that high temperatures are not easily measured. To solve many of the problems associated with the above mentioned temperature measuring means, an interferometric temperature measuring method has been developed.

The interferometric temperature measuring method uses an interferometric sensor formed on the end of an optical fiber. Temperature is measured by detecting variances in an interference fringe pattern between two laser beams within the sensor having different paths. Such an interference temperature measuring method is disclosed in Optics Letter, Vol. 17, No. 14, pp. 1021 in an article entitled SAPPHIRE FIBER BASED INTRINSIC FABRY-PEROT INTERFEROMETER by Ando Wang. Another interference temperature measuring method is disclosed in U.S. Pat. No. 4,714,342 filed on Dec. 22, 1987 by David Jackson. These references show that a change in an interferometric fringe pattern generated within the interferometric sensor can be detected by using electronic equipment including a single-mode fiber directional coupler and a photo diode. Once the degree of change in the interferometric fringe pattern is determined, a corresponding temperature can be calculated.

In contemporary practice, a laser beam emitted from a laser generation source is transmitted to one side of the single-mode fiber directional coupler and reflected back onto the other side. The light is then detected in a photo diode connected to the opposite side of the single-mode fiber directional coupler. The light detected by the photo diode is converted into a corresponding temperature by an electronic circuit. These techniques typically use items such as a single-mode optical fiber, a single-mode fiber directional coupler, a laser diode, an optical detection element, or a temperature conversion circuit, among other circuit components.

An optical temperature sensing system composed of these components may detect an amount of change in interference light generated within the sensor, i.e. the change in the interference fringe pattern as described above by using the photo diode is converted into a corresponding temperature using an electronic circuit.

Contemporary available devices often use interferometers having different structures. The optical temperature sensor introduced by Wang, et al. uses an interferometric sensor having a Fabry-Perot structure. The Fabry-Perot interferometric sensor produces variations in phase difference between two laser beams having different reflecting paths, corresponding to the temperature. On the other hand, the interferometric temperature sensor disclosed in U.S. Pat. No. 4,714,342 issued to Jackson uses an interferometric sensor having a Michelson structure. That is, Jackson's sensor varies the phase difference between two laser beams respectively reflected onto a signal optical fiber and a reference optical fiber, according to the temperature.

Both of the devices described above transmit interfering light from an interferometric sensor to a photo diode using a single-mode fiber directional coupler. In response, the photo diode converts a sensed signal into an electrical signal that is signal processed to determine a measured temperature. Implementation of such conventional interferometric temperature sensing methods is not easy. Such methods are plagued by many difficult problems. Also, since expensive optical elements such as a single-mode fiber directional coupler is required for implementation, practical use of such devices and methods is limited.

One more recent effort to create an interferometric device is disclosed in U.S. Pat. No. 5,202,939 entitled Fabry-Perot Optical Sensing Device For Measuring A Physical Parameter issued to Belleville et al. on 13 Apr. 1993. This device uses a Fabry-Perot interferometer through which a light signal is passed, an optical focusing device for focusing at least a portion of the light signal outgoing from the Fabry-Perot interferometer, and a Fizeau interferometer through which the focused light is passed. A multimode optical fiber optically couples the Fabry-Perot interferometer with a light source. Although this effort purports to achieve satisfactory results during operation, we find that many of the aforementioned problems regarding cost and ease of implementation are still present.

SUMMARY OF THE INVENTION

Accordingly, it is an object of the present invention to provide an improved interferometric temperature sensing system and process.

It is another object to provide an interferometric temperature sensing system and process that can be easily implemented.

It is yet another object to provide an interferometric temperature sensing system and process that measures temperature using an optical detection element using a laser beam emitting element and an optical detection element for converting a laser beam fed back from a sensor into an electric signal, that may be fabricated within a single package.

It is still another object to provide an interferometric temperature sensing system and process able to easily measure a temperature using a laser detection element composed of a laser diode coupled to a photo diode, without using a single-mode fiber directional coupler.

To achieve these and other objects, the interferometric temperature sensing system and process performed according to the principles of the present invention uses an interferometric sensor having one or more reflecting surfaces and different optical paths corresponding to a temperature of a measured object or environment. A laser detection element emits a first laser beam in response to a predetermined modulated driving signal and adjusts the amount of the emitted first laser beam in correspondence with a second laser beam. The laser detection element also detects the magnitude of an adjusted third laser beam to generate a sense signal that includes temperature information. An optical coupler propagates the emitted first laser beam to a proximal end of the interferometric sensor, and couples the laser beams fed back through the proximal end of the interferometric sensor into the second laser beam, and then propagates the coupled beam to the laser detection element; a modulated signal generator generates the modulated driving signal in response to a predetermined pilot signal while a signal processor generates the pilot signal, and detects a temperature change direction of the fringe magnitude and a fringe number of the sense signal to calculate a temperature change.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
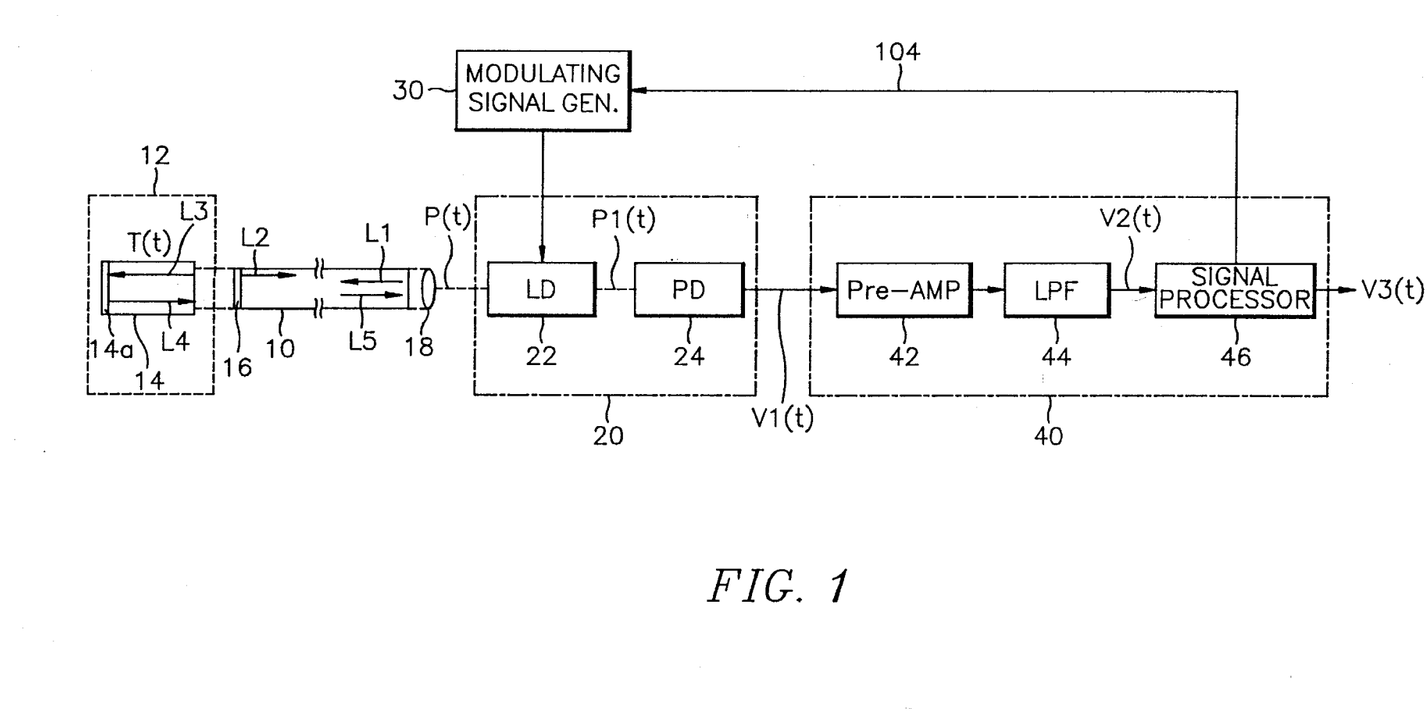
FIG. 1 is a schematic block diagram of an interferometric optical temperature sensing system constructed according to the principles of the present invention.

Turning now to the drawings, FIG. 1 is a schematic block diagram of the interferometric temperature sensing system constructed according to the principles of the present invention. The embodiment shown is constructed with a laser detection element 20 where a laser diode and a photo diode are coupled into a single package. The interferometric temperature sensing system of the present invention, which can measure temperatures in a range of −200° C. to 2000° C., is hereinafter described in detail.

Figure 2:
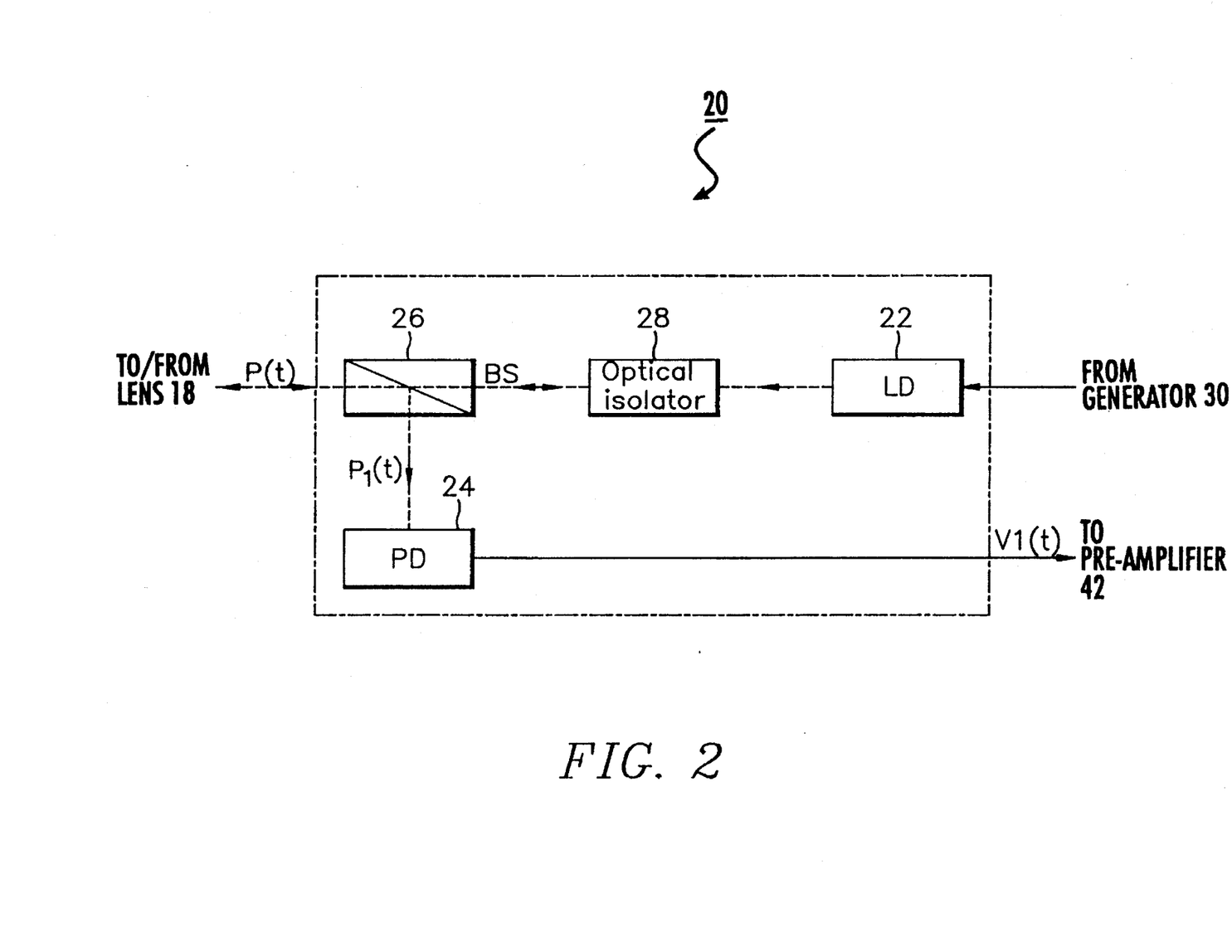
FIG. 2 is another embodiment of the laser detection element shown in FIG. 1.

The interferometric temperature sensing system of the present invention has a modulated signal generator 30 for generating a driving bias current. Modulated signal generator 30 also generates a modulated pulse in response to a predetermined pilot signal, and overlaps the modulated pulse with the driving bias current to generate a modulated driving signal. A laser detection element 20 emits a laser beam in response to the modulated driving signal generated by modulated signal generator 30, adjusting the magnitude of the emitted laser beam in correspondence with the magnitude of a feed-back component of the laser beam P(t), and detects the amount of the returning beam in order to generate a sense signal V1(t) indicative of temperature information derived from the laser beam (FIG. 2 shows a second embodiment of laser detection element 20). A single-mode optical fiber 10, having a first end proximal to laser detection element 20 and a second end distal to laser detection element 20, reflects from mirror 16 positioned near its distal end a primary portion L2 of the component of laser beam emitted from laser detection element 20 and transmits this first reflected beam L2 back to its proximal end. Single-mode optical fiber 10 also receives a second reflected beam L4 at its distal end and transmits this second reflected beam coupled with the first reflected beam L2, back to the proximal end, thereby delivering a combined laser beam L5 to its proximal end. A lens 18 located at the proximal end of fiber 10 is provided for optically coupling laser detection element 20 and single-mode optical fiber 10. A sensor 12, connected to the distal end of single-mode optical fiber 10, varies its optical path in correspondence with a measured temperature. Sensor 12 also reflects a remaining laser beam L3 propagated through the distal end of single-mode optical fiber 10 to propagate the second reflected beam L4 to the distal end of single-mode optical fiber 10 along the varying optical path.

A temperature processor 40 generates a reference frequency of a predetermined period, and generates a pilot signal in response to the reference frequency; processor 40 also supplies the pilot signal to modulated signal generator 30, and additionally amplifies the sense signal with preamplifier 42 to a predetermined level signal, filters the amplified sense signal with low pass filter 44 and processes the filtered sense signal V1(t) in order to convert the filtered signal into a representation of the temperature originally indicated by sensor 12.

Figure 3:
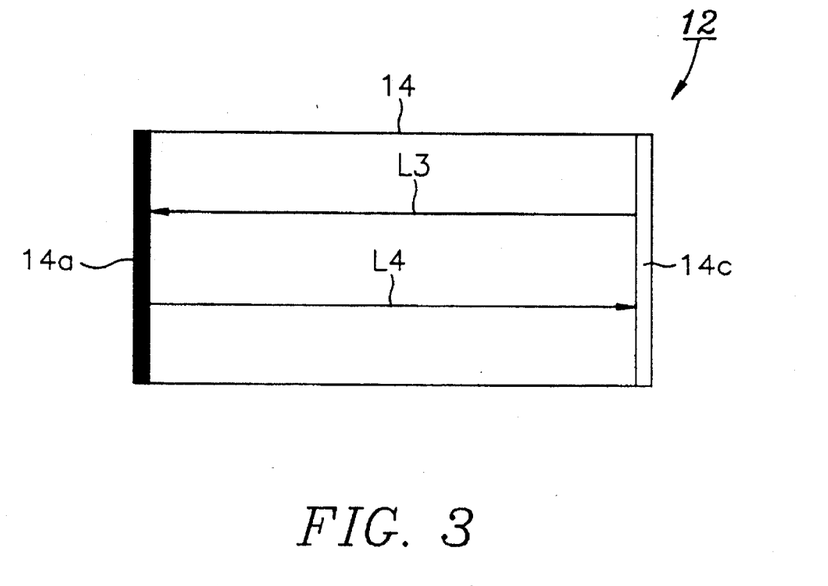
FIG. 3 is a detailed diagram of the sensor shown in FIG.1.

FIG. 3, a detailed diagram of sensor 12 shown in FIG. 1, illustrates a Fabry-Perot interferometer sensor. The Fabry-Perot interferometer sensor is composed of a semi-transparent mirror 14c positioned at a first end of an optical fiber 14 within sensor 12. Optical fiber 14 has a predetermined length and is coated with a material such as sapphire, quartz, polymer, etc. Sensor 12 further includes a minor 14a positioned on a second end of optical fiber 14. Mirror 14a is coated with a dielectric material or is fusion-spiced with a metal having a high reflection factor. Semi-transparent minor 16 can be placed within the distal end section of single-mode optical fiber 10, as depicted by reference numeral 16 of FIG. 1. Mirror 14a is highly reflective and operates to reflect all laser beams, while semi-transparent mirror 14c (or mirror 16 as shown in FIG. 1) is only partially reflective, reflecting only a portion of the laser beams while passing a remainder of the laser beams. Sensor 12 can be formed without the mirror 14a and the semi-transparent mirror 14c (or mirror 16).

In a preferred embodiment of the present invention, a Fabry-Perot interferometer constructed from optical fiber 14, is used as sensor 12 to obtain an indication of the value of a temperature to be measured; a Michelson interferometer, a Mach-Zehnder interferometer or a Fizeau interferometer could also be used.

The connection between single-mode optical fiber 10 and optical fiber 14 within sensor 12 can be done by butt-coupling method their polished adjoining terminal surfaces using bonding or fusion splicing.

In the configuration of FIG. 1, laser detection element 20 includes a laser diode 22 and a photodiode 24 combined within a single monolithic, unitary package. Laser detection element 20 is optically connected to the proximal end of single-mode optical fiber 10 through lens 18, and can detect the magnitude P1(t) of an emitted laser beam from the magnitude P(t) of a feed-back laser beam. Laser detection element 20 can be the "LT022MC" model device manufactured by Japanese semiconductor maker Hitachi, Ltd., or another similar product.

FIG. 2 shows another embodiment of laser detection element 20 shown in FIG. 1 including: a beam splitter (BS) 26, an optical isolator 28, laser diode 22 and photodiode 24 combined within a monolithic, unitary package. In this embodiment, the laser beam fed back from lens 18 is split into two beams via beam splitter 26. One beam is transmitted to optical isolator 28 while the other beam P1(t) is transmitted to photodiode 24. This second embodiment of laser detection element 20 can be a single longitudinal mode laser such as the HL8318 model device manufactured by Hitachi. With the laser detection element 20 shown in FIG. 2, it is possible to reduce the amount of noise in sense signal V1(t). Also, since laser diodes of a single longitudinal mode have a long coherence length, this embodiment advantageously separates sensor 12 from temperature processor 40.

Referring back to FIG. 1, temperature processor 40 has a pre-amplifier 42 for amplifying sense signal V1(t) (which contains temperature information) to a signal having a predetermined amplitude. A low-pass filter 44 low-pass-filters sense signal V1(t) following amplification, to generate a noise-removed sense signal V2(t). A signal processor 46 generates a predetermined reference frequency, provides the pilot signal in response to the reference frequency and supplies the pilot signal to modulated signal generator 30 via lead 104. Signal processor 46 also processes noise-removed sense signal V2(t) and supplies the processed signal as a temperature information signal V3(t).

Figure 4A:
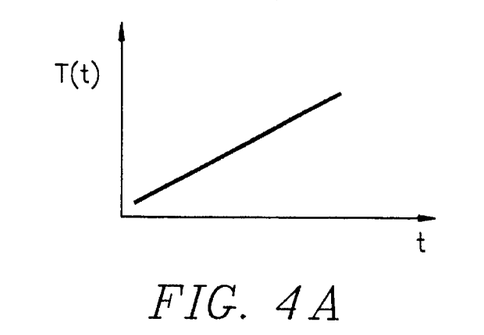
FIGS. 4A through 4D show how the magnitude of laser beams P(t) and P1(t) and sense signals V1(t) and V2(t) vary according to temperature T(t) in a sensor of the interferometric temperature sensing system shown in FIG. 1.
Figure 4B:
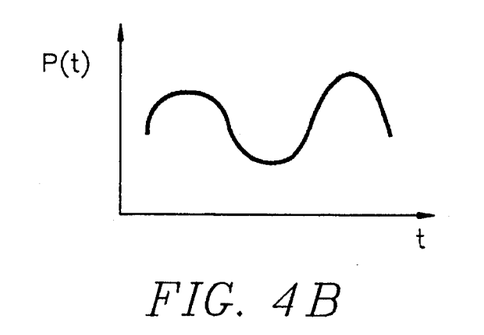
Figure 4C:
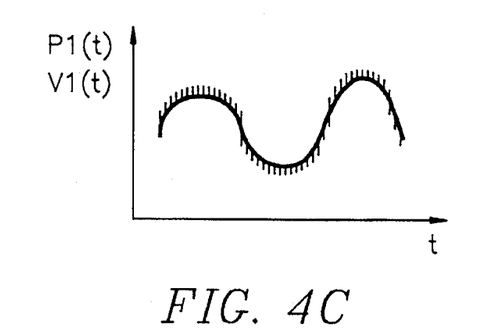
Figure 4D:
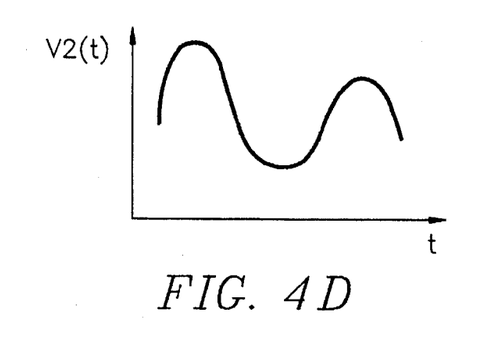

FIGS. 4A to 4D graphically illustrate the waveforms of the various signals generated during operations of the system shown in FIG. 1. FIG. 4A shows the relationship between temperature T(t) and time t within sensor 12 over a period of time. FIG. 4B shows that the magnitude of laser beam P(t) fed back from single-mode optical fiber 10 varies over one and one-half cycles of the interferometric fringe pattern of feed back laser beam L5 in time (this is, over the period represented in FIG. 4A) in response to the varying temperature T(t) illustrated in FIG. 4A. The magnitude of laser beam P1(t) emitted from laser diode 22 in response to feed-back laser beam L5 varies in time over the period as shown in FIG. 4C, in dependency upon the variation of feed-back laser beam L5. The output of photo diode 24 generated by converting laser beam P1(t) into an electrical signal to be supplied to temperature processor 40 as sense signal V1(t) varies in time over the period as shown in FIG. 4C. As received by detector element 20, noise is entrained with laser beam P1(t) and thus with sense signal V1(t). FIG. 4D shows a segment of noise-removed sense signal V2(t) after pre-amplifying sense signal V1(t) in pre-amplifier 42 and low-pass-filtering the amplified signal in low-pass filter 44 to remove those entrained noise components. As shown in the above drawings, embodiments of the present invention may be used to measure either the change in temperature of an object whose temperature is being measured, or an ambient environmental temperature.

Figure 5:
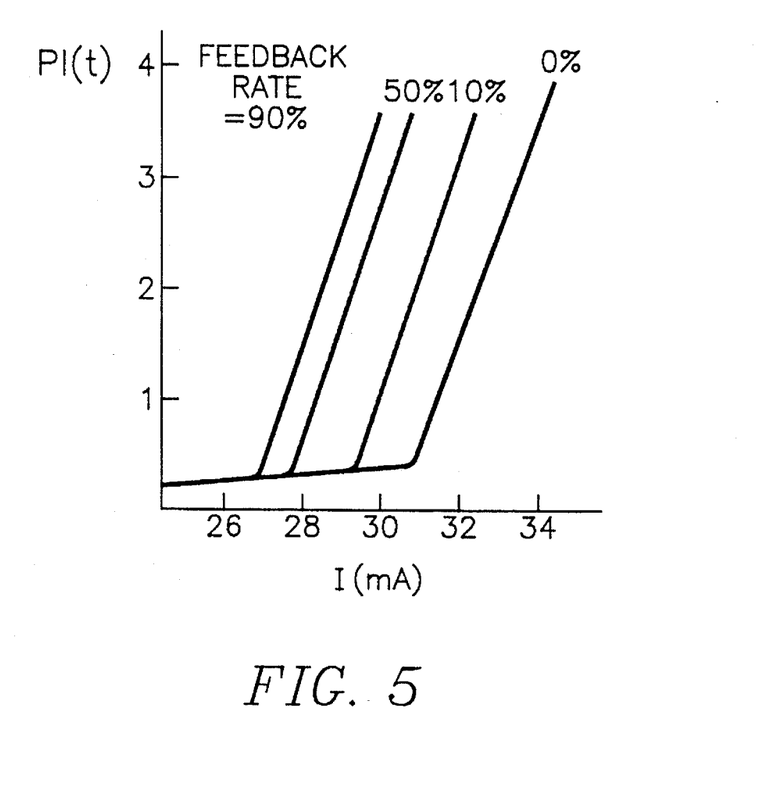
FIG. 5 shows how the relation between electrical current from the laser diode shown in FIG. 1 and the magnitude of laser beam P1(t) varies according to the magnitude of the feed-back laser beam P(t)

FIG. 5 shows how the relationship between electrical current, I, from laser diode 22 and the magnitude of laser beam P1(t) varies according to the magnitude of feed-back laser beam L5 at different rates of feed-back of laser beam P(t). This increase in laser output with increasing feedback of laser beam is due to the self-coupling effect described in SPIE, Vol. 382, 1983, pp 217, in an article entitled "Self-Coupled Optical Pickup" by Y. Mitsuhashi, et al.

Figure 6:
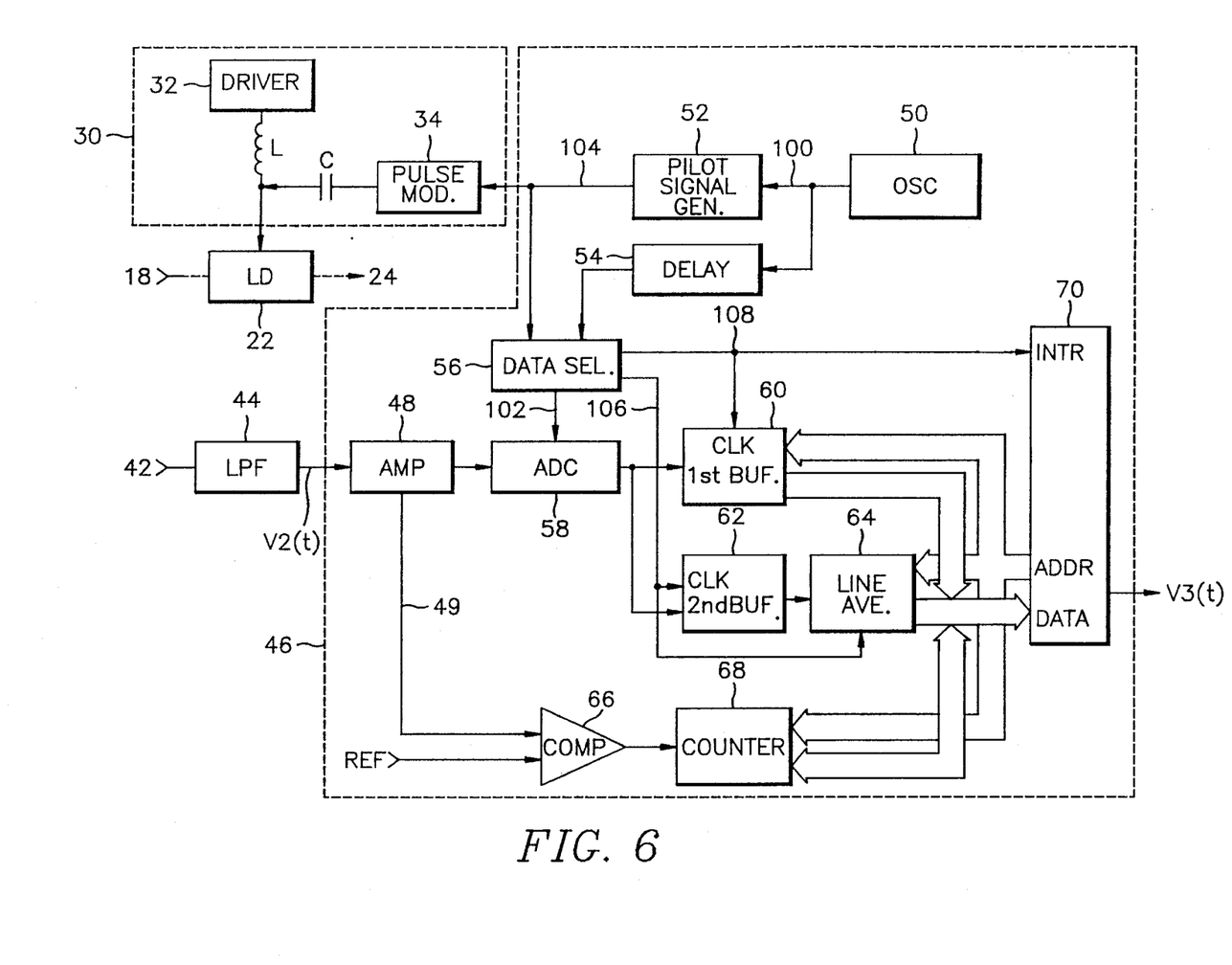
FIG. 6 is a detailed diagram of the signal processor shown in FIG.1.

FIG. 6 is a detailed diagram of modulated signal generator 30 and signal processor 46 shown in FIG. 1. Signal processor 46 has an oscillator (OSC) 50 for generating a reference frequency signal via lead 100, with a predetermined period. A pilot signal generator 52 generates a pilot signal via lead 104 during a predetermined interval in response to the reference frequency signal received via lead 100. A delay circuit 54 delays the reference frequency signal received via lead 100 by a predetermined amount to generate a reference frequency signal via lead 101 to enable sampling of an analog signal with a sampling rate derived from the frequency of the reference frequency signal. A data selector 56, which receives a pilot signal via lead 104 and the reference frequency signal via lead 101, simultaneously supplies a sampling frequency signal via lead 102, an average control signal via lead 106 and a transmission control signal via lead 108 to various components within signal processor 46. An amplifier 48 amplifies noise-removed sense signal V2(t) supplied from low-pass filter 44 to an amplitude exhibiting a predetermined level. An analog-to-digital converter (hereinafter referred to as ADC) 58, for sampling noise-removed sense signal V2(t) after amplification, at a sampling rate set by the sampling frequency signal received via lead 102, converts noise-removed sense signal V2(t) into digital form.

A first buffer 60 latches and transmits a first portion of data (i.e. front-positioned data within a predetermined period) supplied from ADC 58 in response to the transmission control signal received via lead 108 and applied as a clock signal to the clock port of first buffer 60. A second buffer 62 latches and transmits a second and remaining portion of data (i.e. all data within the predetermined period other than the front-positioned data) supplied from ADC 58 in response to the average control signal received via lead 106 and applied as a clock signal to the clock port of second buffer 62. A line averager 64 averages data sequentially transmitted from second buffer 62 to generate an average value signal via data bus 65.

A comparator 66 compares an amplified noise-removed sense signal V2(t) supplied from amplifier 48 via lead 49 with a predetermined reference voltage REF and generates a fringe pulse if the voltage of amplified noise-removed sense signal V2(t) is greater than the level of reference voltage REF. A counter 68 counts fringe pulses generated from comparator 66 in response to a direction determining signal. A microprocessor (μP) 70 determines the direction of a temperature change by analyzing the data and average value respectively supplied from first buffer 60 and line averager 64, in response to the transmission control signal transmitted via lead 108. Microprocessor 70 also calculates the magnitude of the temperature change by supplying a direction determining signal to counter 68 while simultaneously receiving the output of counter 68. A final calculated value is then supplied as temperature information signal V3(t).

Modulated signal generator 30, which adjusts the magnitude of the laser beam P(t) emitted from laser diode 20 in response to the pilot signal on lead 104, has a driving circuit 32 for generating the driving bias current, and a pulse modulator 34 for modulating the driving bias current in response to the pilot signal on lead 104. Also, reference numerals L and C represent a inductance element and a capacitance element, respectively. These elements operate upon the modulation pulse supplied from pulse modulator 34 and the driving bias current supplied from driving circuit 32 to supply a pulse-modulated driving bias current to laser diode 22.

Figure 7A:
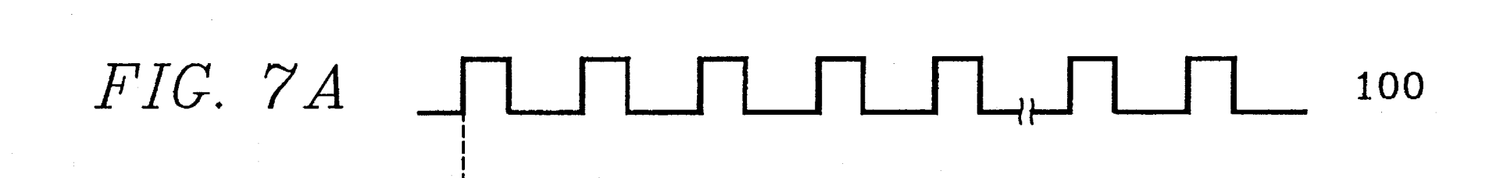
FIGS. 7A through 7E are timing diagrams of input/output signals of the data selector shown in FIG. 6.
Figures 7B, 7C:
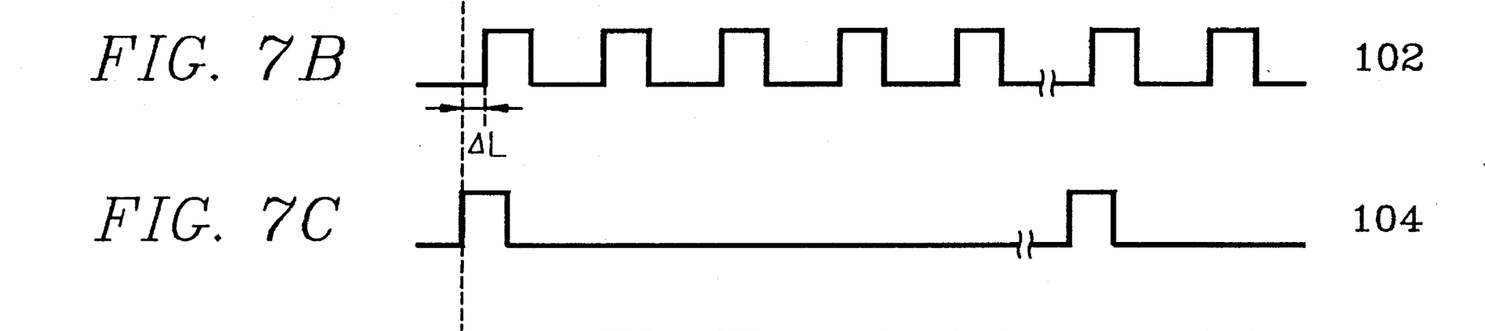
Figures 7D, 7E:
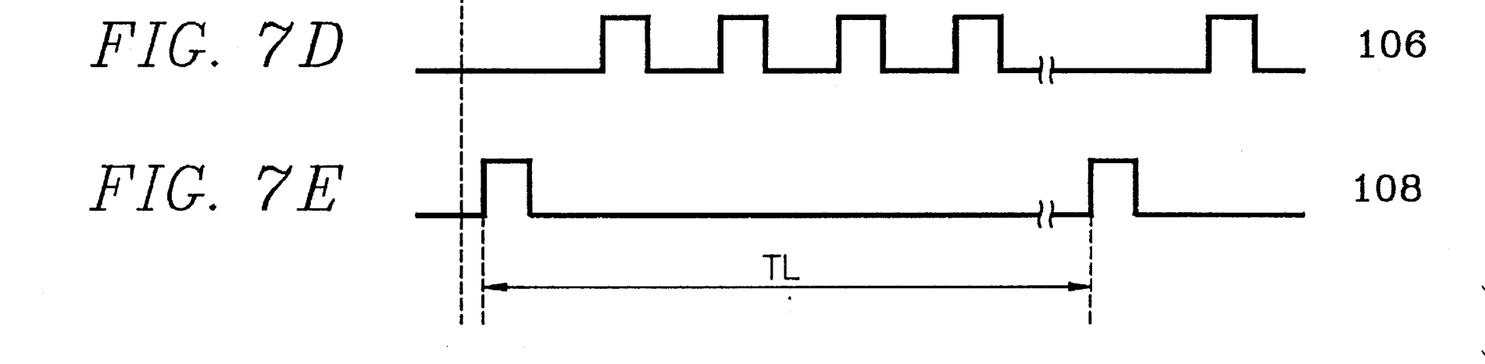

FIGS. 7A to 7E illustrate timing diagrams of input and output (I/O) signals in data selector 56 shown in FIG. 6. The signals are control signals for determining the direction of a temperature change. FIG. 7A is a waveform diagram of reference frequency signal generated in oscillator 50 and transmitted via lead 100. FIG. 7B is a waveform diagram of the sampling frequency transmitted via lead 102 that has been delayed by a predetermined interval with respect to the reference frequency transmitted via lead 100. FIG. 7C is a waveform diagram of the pilot signal generated 104 generated after receipt of reference frequency 100. FIG. 7D is a waveform diagram of the average control signal transmitted via lead 106 for averaging digital data of a signal V1(t) continuously supplied from laser detection element 20. FIG. 7E is a waveform diagram of the transmission control signal transmitted via lead 108 which controls the transmission of digital data corresponding to noise-removed sense signal V2(t) supplied from laser detection element 20.

Turning now to FIGS. 3 to 7D, the operation of the system shown in FIG. 1 is described in detail as follows. The interferometric temperature sensing system having a previously set reference temperature is operated according to the driving of driving circuit 32, and signal processor 46 within temperature processor 40. If oscillator 50 within signal processor 46 generates the reference frequency transmitted via lead 100, pilot signal generator 52 extracts the frequency at a constant interval, thereby generating the pilot signal on lead 104. Pulse modulator 34 generates a predetermined modulation pulse in response to the pilot signal on lead 104. At this time, the driving bias current generated in driving circuit 32 is modulated by the modulation pulse.

The modulated driving bias current is supplied to laser diode 22, which emits the laser beam in correspondence with the modulated driving bias current. The laser beam emitted from laser diode 22 is transmitted to optical coupling lens 18 through a front portion of laser diode 22, and at the same time, a portion of the laser beam is transmitted to photo diode 24 through a rear portion of laser diode 22. A laser beam L1 passing through lens 18 is transmitted to optical fiber 14 within sensor 12 through single-mode optical fiber 10. Lens 18 is composed of at least one lens, and focuses the laser beam emitted from laser diode 22 onto an input side of single-mode optical fiber 10.

Laser beam L1 is propagated through optically transmitting single-mode optical fiber 10. A primary portion of L1 is reflected back as L2 from mirror 16 positioned within the distal end section of single-mode optical fiber 10 (or mirror 14c within sensor 12). Laser beam L3, except for the primary reflected portion L2, is propagated through optical fiber 14 of Fabry-Perot interferometric sensor 12. Laser beam L3 is then reflected back as beam L4 from total reflection mirror 14a formed at the second end of optical fiber 14 within sensor 12. The primary and secondary reflected laser beam portions L2 and L4 are coupled into a single laser beam, denoted as L5. Then, L5 is optically fed-back through single-mode optical fiber 10 beam to laser diode 22 within laser detection element 20.

In the previously described embodiment of the present invention, laser beam L1 propagated through single-mode optical fiber 10 is primarily reflected by mirror 16 positioned at the distal end of single-mode optical fiber 10 (or mirror 14c within sensor 12). The sequence described above can also be performed without the use of mirrors 14a and 14c (or 16) by using different materials to construct single-mode optical fiber 10 and optical fiber 14 within sensor 12. That is, if single-mode optical fiber 10 and optical fiber 14 within sensor 12 are composed of materials having different refractive indices, a reflected laser beam can be obtained by the fresnel reflection phenomenon according to the different refractive indices of the two optical fibers. Accordingly, as described above, optical fibers having different refractive indices can be used in the present invention.

The primary and secondary reflected laser beams L2 and L4 interfere when they are coupled within single-mode optical fiber 10 as a single beam shown as L5. Accordingly, laser beam L5 which is fed back to laser diode 22, includes an interference fringe pattern. The magnitude P(t) of feedback laser beam L5 varies according to the environmental temperature T(t) of sensor 12. If the environmental temperature T(t) of sensor 12 varies as shown in FIG. 4A, the magnitude P(t) of feed-back laser beam L5 varies as shown in FIG. 4B. Accordingly, if the temperature T(t) of sensor 12 is changed, the interference fringe pattern is also changed. Accordingly, the magnitude P(t) of feed-back laser beam L5 is tantamount to temperature information since it corresponds to the environmental temperature of sensor 12.

The magnitude P(t) of laser beam L5, which includes the interference fringe pattern, varies according to temperature the T(t) of sensor 12. That is, the phase difference φ between laser beams L2 and L4 respectively reflected on mirror 14c (or mirror 16 positioned on the distal end of single-mode optical fiber 10) and mirror 14a positioned on the second end of optical fiber 14 within sensor 12, is changed according to temperature T(t). This phase difference φ is attributed to the optical paths of the two beams, L2 and L4, having differing lengths. If the shift of phase difference is Δφ when sensor 12 including optical fiber 14 of refractive index n and length L experiences a temperature change ΔT, (as shown in FIG. 4A) the relationship is expressed in the following equation (1):

$$\Delta\phi = \frac{4\pi n L}{\lambda_0} \left( \frac{1}{L} \frac{dL}{dT} + \frac{1}{n} \frac{dn}{dT} \right) \Delta T \qquad (1)$$

In equation (1), (1/L)(dL/dT) is the linear expansion of optical fiber 14 within sensor 12, and (1/n)(dn/dT) indicates the temperature dependency of the refractive index n. $\lambda_0$ is the wavelength of the laser beam in a vacuum. In equation (1), the shift of phase difference Δφ increases, as the length L of optical fiber 14 within sensor 12 becomes longer and refractive index n of optical fiber 14 within sensor 12, linear expansion (1/L)(dL/dT), and temperature dependency (1/n)(dn/dT) of refractive index n become larger. Whenever the shift of phase difference Δφ calculated as shown in equation (1) is shifted by 2π, one optical fringe is shifted. Accordingly, temperature change ΔT can be known if the number of shifted optical fringes and the interference fringe pattern are known as described above.

The following equation (2) represents a change rate in temperature for one fringe.

$$\Delta T/\text{fringe} = \frac{\lambda_0}{2nL} \left( \frac{1}{L} \frac{dL}{dT} + \frac{1}{n} \frac{dn}{dT} \right)^{-1} \qquad (2)$$

For instance, if the material of optical fiber 14 within sensor 12 is sapphire ($Al_2O_3$, $_{c\text{-}axis}$) and its length is 1 cm., the sum of linear expansion of optical fiber 14, (1/L)(dL/dT), and temperature dependence of refractive index n, $(1/n)(dn/dT)$, at the normal temperature, is as follows:

$$\frac{1}{L}\frac{dL}{dT}+\frac{1}{n}\frac{dn}{dT} \approx 1.32\times 10^{-5}/°C. \quad (3)$$

Also, in equation (3), since the refractive index n at wavelength 633 nm is 1.766, when a He—Ne laser is used as a light source, one fringe is generated for every 1.35° C. of change in temperature. With reference to FIGS. 4A and 4B then, for a sensed temperature change of $\Delta T=1.35°$ C. in FIG. 4A over the period of time $\Delta t$, in FIGS. 4B and 4C a phase shaft $\Delta\phi=2\pi$ occurs during the some period. This sensitivity can be made higher by using for optical fiber 14 a material having a higher linear expansion or by increasing the length of optical fiber 14. The ability to lengthen optical fiber 14 is limited however since coherence of lasers (interference of lasers) is limited and uniform temperature reading is difficult.

In one embodiment of the present invention, a laser diode 22 ($\lambda \approx 800$ nm) that is small in size and emits coherent beam is used. To easily monitor the number of optical fringes and the interference fringe pattern, feed-back laser beam L5 is butt-coupled to laser diode 22 through single-mode optical fiber 10 and lens 18. Here, it is noted that the magnitude P(t) of feed-back laser beam L5, including the interference fringe pattern, varies as shown in FIG. 4B according to temperature T(t) of sensor 12. That is, feed-back laser beam L5 is a signal including temperature change information.

When feed-back laser beam L5 is fed back to laser diode 22 within laser detection element 20, the threshold current of laser diode 22 is decreased. Accordingly, the magnitude of laser beam P1(t) supplied from laser diode 22 increases as the magnitude of feed-back laser beam P(t) increases as shown in FIG. 5. Since the threshold current of laser diode 22 is decreased as the magnitude P(t) of feed-back laser beam L5, increases, the increase in magnitude of laser beam P1(t) emitted from laser diode 22 is referred to as a self coupling effect. Such self coupling effects are not generated if the temperature measured in sensor 12 has not changed. The present invention uses such self coupling effects where the magnitude of emitted laser beam P1(t) increases or decreases as the magnitude of feed-back laser beam L5, P(t), increases or decreases, and uses laser diode 22 as part of the light receiving element for receiving the temperature sensing light. The interference fringe pattern corresponding to the temperature change of sensor 12 can be tracked by using signal processor to monitor the change in the magnitude of laser beam P1(t) emitted from laser diode 22 via photo diode 24. The change in the amount of light corresponding to the temperature change is converted into a representation of temperature by properly processing the sense signal V1(t) using an electronic circuit. If laser beam L5 reflected from sensor 12 is fed back to laser diode 22, the magnitude of the laser beam P1(t) emitted from laser diode 22, changes as shown in FIG. 4C. An intensity noise factor due to optical feed-back is included in determining the magnitude of the laser beam P1(t) emitted from laser diode 22. Intensity noise includes both low-frequency noise and high-frequency noise. Low-frequency noise is generated by random interference between the optical field within laser diode 22 and feed-back laser beam L5, and has a spectrum region of several tens of kilo-Hertz. Meanwhile, high-frequency noise is largely generated according to the phase matching condition between feed-back laser beam L5 and the optical field within laser diode 22, and has strong spectrum peaks at frequencies $$F_{ex}=\frac{mc}{2nLF} \quad (4)$$

where m=0, 1, 2, 3 .... Such high-frequency noise can be removed however, by properly using a filter. For instance, noise resulting from phase, frequency, and other causes, can be removed using low-pass filter 44 as shown in FIG. 1, or alternatively, by using a band-pass filter.

The laser beam emitted from laser diode 22 having the magnitude P1(t) as shown in FIG. 4C is coupled to photo diode 24, which is combined in one package with laser diode 22. Photo diode 24 converts an output laser beam supplied from laser diode 22, which includes temperature information, into an electrical signal. This converted signal is transmitted, as sense signal V1(t), to pre-amplifier 42 to be amplified to a predetermined level. After high-frequency noise in the pre-amplified sense signal is removed in low-pass filter 44, it is supplied as noise removed sense signal V2(t) to signal processor 46. Noise removed sense signal V2(t) is then processed in signal processor 46 and supplied as temperature information V3(t).

Operations Of The Signal Processor And Related Peripheral Circuits

If oscillator 50 generates the reference frequency signal transmitted via lead 100 as shown in FIG. 7A, pilot signal generator 52 gates the pulses of the reference frequency signal received via lead 100 for each predetermined period, thereby generating pilot signal 104 as shown in FIG. 7C. Pulse modulator 34 is connected to pilot signal generator 52, and pulse-modulates the pilot signal received via lead 104, and supplies the pulse-modulated signal to laser diode 22 through capacitance element C. The frequency of the pulse-modulated signal is closely related to the cut-off frequency of low-pass filter 44, and is in the range of one to ten kilo-Hertz. For a high-speed measuring element however, the frequency of the pulse-modulation signal should be set higher.

Delay circuit 54 receiving the reference frequency signal via lead 100 delays the reference frequency by $\Delta L$, as is shown in FIG. 7B, to supply the sampling frequency signal via lead 102 for sampling noise-removed sense signal V2(t). $\Delta L$ represents the period of time between the driving of laser diode 22 by the pulse of the modulated driving signal and the reception of the laser beam in low-pass filter 44 after the laser beam emitted in laser diode 22 is reflected by single-mode optical fiber 10 and sensor 12. The delay time needs to be larger than one-half of the pulse width of reference frequency signal on lead 100, and shorter than one pulse width of the reference frequency signal on lead 100. Also, it is preferred that the period of the reference frequency signal on lead 100 be limited within the range between five hundred nanoseconds to several microseconds, in order to enable simple signal-processing. For example, with the reference frequency signal exhibiting a reference frequency of $f_o$, $$500 nsec \leq \frac{1}{4f_0} < \Delta L < \frac{1}{2f_0} \leq 10 \mu sec \quad (5)$$

Also, the relationship between delay time $\Delta L$ and reference frequency $F_o$, is represented as, $$\Delta L = \frac{X}{2f_o} \quad (6)$$

where $\frac{1}{2}f_o$ represents the pulse width and $\frac{1}{2}<x<1$.

Data selector 56, connected via lead 101 to delay circuit 54, supplies the sampling frequency via lead 102 as a sampling clock signal to ADC 58. Also, data selector 56 extracts only an initial pulse of the sampling frequency on lead 102 within a predetermined period of time TL (shown in FIG. 7E) to supply the extracted frequency as transmission control signal via lead 108 to first buffer 60 and to an interrupt terminal INTR of microprocessor (MPU) 70. Data selector 56 supplies the other frequencies, except the initial portion of the delayed sampling frequency signal (shown in FIG. 7B), via lead 102 within predetermined period TL, as an average control signal (represented in FIG. 7D) via lead 106, as a clock signal to second buffer 62 and to line averager 64. Accordingly, the transmission control signal supplied via lead 108 and the average control signal supplied via line 106 from data selector 56 are exclusively related.

The relationship between reference frequency $f_0$ and predetermined period TL, is represented as $$TL = \frac{n}{f_0} \quad (7)$$

where n indicates the number of pulses within one period.

Noise-removed sense signal V2(t) supplied from low-pass filter 44 is supplied to amplifier 48. Amplifier 48 amplifies noise-removed sense signal V2(t) by a predetermined amount and supplies the amplified signal to ADC 58 and comparator 66. At this time, the magnitude of noise-removed sense signal V2(t) after amplification in amplifier 48 corresponds to a magnitude capable of driving ADC 58. After amplification, ADC 58 digitally-converts noise-removed sense signal V2(t) in correspondence with the sampling frequency signal supplied via lead 102 from data selector 56. The converted data is then fed to first buffer 60 and second buffer 62.

First buffer 60 latches the data supplied from ADC 58 in response to the transmission control signal received via lead 108 (which is the first generated pulse within predetermined period of time TL), and then transmits the latched data to microprocessor MPU 70. That is, first buffer 60 latches the digital data corresponding to the magnitude of the laser beam emitted from laser diode 22 (i.e. in response to the modulation pulse from pulse modulator 34), in response to transmission control signal received via lead 108, and then transmits the latched data to MPU 70. Here, the modulation pulse is a signal which is pulse-width-modulated by pulse modulator 34 after receiving pilot signal via lead 104 from pilot signal generator 52. Accordingly, the data fed to first buffer 60 is the data of noise-removed sense signal V2(t) transmitted according to the modulation pulse. Second buffer 62 latches the digital data of noise-removed sense signal V2(t) (i.e. an electrical conversion signal of laser beam L5 reflected and fed back from sensor 12) in response to average control signal 106, and then transmits the latched data to line averager 64. Accordingly, second buffer 62 supplies a digital signal, including an interference fringe pattern related to the temperature of sensor 12, in synchronization with average control signal received via lead 106. Line averager 64 averages binary data received from second buffer 62, and supplies an averaged value to MPU 70.

Microprocessor 70 reads these two data components received from first buffer 60 and line averager 64 in response to transmission control signal 108, and then stores the data received within an internal memory. MPU 70 drives an algorithm QDM for determining a direction of temperature change from the stored data sets received over several periods. That is, data supplied from first buffer 60 and line averager 64 is used to calculate the magnitude of temperature change within the same fringe. MPU 70, after determining the direction of temperature change using algorithm QDM, supplies a temperature direction determining signal to counter 68. At this time, the counting mode of counter 68 is determined according to the temperature direction determining signal. For instance, when the temperature direction determining signal indicates an increasing temperature, counter 68 is set to an up-counting mode to provide a count of the number of fringe maxima, or minima, occurring in an amplified sense signal V2(t) and incrementally representing the extent of temperature change sensed, and when the temperature direction determining signal indicates a decreasing temperature, counter 68 is set to a down-counting mode to decrement the count of fringe maxima, or minima. Counter 68, whose counting mode has been set as described above, then counts the number of fringe pulses supplied from comparator 66 and supplies the counted number to MPU 70. Comparator 66 compares noise-removed sense signal V2(t) supplied from amplifier 48 with predetermined reference voltage REF to generate a fringe pulse when the magnitude of the sense signal is greater than the magnitude of reference voltage REF. Accordingly, counter 68 provides to MPU 70, the counted number of fringe pulses corresponding to the temperature change direction. The reason for counting the fringe pulses, as described above, is to enable calculation of a rapidly varying temperature.

Microprocessor 70 which has stored the data supplied from first buffer 60 and the average data supplied from line averager 64 in an internal memory, calculates the magnitude of temperature by processing, in algorithm QDM, the count value of fringe pulses supplied from counter 68 and the above data. QDM algorithms are well-known in the art, such an algorithm is disclosed in SPIE, Vol. 1584, 1991, pp. 72, in an article entitled "IN-LINE FABRY-PEROT INTERFEROMETRIC TEMPERATURE SENSOR WITH DIGITAL SIGNAL PROCESSING" by Y. Yeh et al.

The magnitude of temperature calculated in MPU 70 can be displayed on a variable visual display (not shown) as easily viewable information. The temperature can be displayed in both Celsius and Fahrenheit using MPU 70. Accordingly, a user can observe the varying temperature of a particular object or environment.

Since the present invention has a simpler structure than most general interferometric temperature sensors, it is extremely practical and is able to be used in almost any place requiring a temperature measurement. The present invention is particularly useful in environments where temperature measurements cannot be done using conventional electric temperature measuring methods. Such environments include jet engines, nuclear reactors, transformers, transformer substations, etc. Also, since the present invention is accurate to within ±0.025° C. in a temperature range of −100° C. to 1000° C., it has the advantage of being applicable to the treatment of cancer using microwave techniques.

As described above, the present invention easily and accurately detects and processes interference fringe patterns using the self coupling effects of a laser detection element, where a photo diode and a laser diode are included in one package. Accordingly, the present invention is easily constructed, and temperatures can be measured within a wide range.

What is claimed is:

1. An interferometric temperature sensing system having a coupled laser diode, said system comprising:

interferometric sensing means having at least a single reflector and providing different optical paths for laser beams corresponding to a temperature of a measured object or an environment, said interferometric sensing means for receiving a remainder portion of an emitted laser beam at a first end and feeding back a secondary reflected portion of said emitted laser beam after said remainder portion of said emitted laser beam is reflected by said single reflector positioned on a second end of said interferometric sensing means opposite said first end;

laser detection means for emitting said emitted laser beam in response to a predetermined modulated driving signal, and adjusting a magnitude of said emitted laser beam to correspond to a magnitude of a prior feed-back laser beam, said laser detection means generating a sense signal indicative of temperature information in dependence upon a degree of adjustment of the magnitude of said emitted laser beam;

optical coupling transmission means for transmitting said emitted laser beam to said first end of said interferometric sensing means, coupling said secondary reflected portion of said emitted laser beam with a primary reflected portion of said emitted laser beam into a combined laser beam, and then transmitting said combined laser beam to said laser detection means;

driving signal generation means for generating said predetermined modulated driving signal in response to a predetermined pilot signal; and temperature processing means for generating said predetermined pilot signal, and detecting temperature change direction and a fringe number indicated by said sense signal to calculate a temperature change value.

2. The interferometric temperature sensing system as claimed in claim 1, wherein said laser detection means comprise:

a laser diode for propagating said emitted laser beam to said optical coupling transmission means in response to said modulated driving signal and for adjusting the magnitude of said emitted laser beam corresponding to the magnitude of said prior feed-back laser beam; and an optical detection element for converting the degree of adjustment of the magnitude of said emitted laser beam into said sense signal indicative of said temperature information, said laser diode and said optical detection element being included together in a single package.

3. The interferometric temperature sensing system as claimed in claim 2, wherein said optical detection element comprise a photo diode.

4. The interferometric temperature sensing system as claimed in claim 2, wherein said optical coupling transmission means comprise:

a single-mode optical fiber for transmitting said emitted laser beam to said first end of said interferometric sensing means, coupling said primary and secondary reflected portions of said emitted laser beam into said combined laser beam including an interference fringe pattern caused by a phase difference between said primary and secondary reflected portions of said emitted laser beam, and then transmitting said combined laser beam to said laser diode; and a lens for optically coupling said emitted laser beam propagated from said laser diode to a first end of said single-mode optical fiber, and optically coupling said combined laser beam fed back through said first end of said single-mode optical fiber to said laser diode.

5. The interferometric temperature sensing system as claimed in claim 4, wherein said interferometric sensing means comprise a Fabry-Perot sensor.

6. The interferometric temperature sensing system as claimed in claim 5, wherein said Fabry-Perot sensor comprises:

an optical fiber having a first end connected to a second end of said single-mode optical fiber opposite said first end, said first end of said optical fiber being coated with reflective material for partially reflecting said emitted laser beam back to said first end of said single-mode optical fiber as said primary reflected portion of said emitted laser beam, and propagating said remainder portion of said emitted laser beam to said second end of said interferometric sensing means; and total reflection means positioned on said second end of said interferometric sensing means for completely reflecting said remainder portion of said emitted laser beam back to said first end of said optical fiber as said secondary portion of said emitted laser beam.

7. The interferometric temperature sensing system as claimed in claim 6, wherein said total reflection means comprise a dielectric material having a high reflection factor, said total reflection means being positioned on a second end of said optical fiber opposite said first end.

8. The interferometric temperature sensing system as claimed in claim 6, wherein said total reflection means comprise a metallic material having a high reflection factor and is positioned on a second end of said optical fiber opposite said first end.

9. The interferometric temperature sensing system as claimed in claim 6, wherein said first end of said optical fiber is coated with dielectric materials and is butt-coupled to said second end of said single-mode optical fiber.

10. The interferometric temperature sensing system as claimed in claim 6, wherein said first end of said optical fiber is coated with dielectric materials and is fusion-spliced to said second end of said single-mode optical fiber.

11. The interferometric temperature sensing system as claimed in claim 6, wherein said driving signal generation means comprise:

driving means for generating a predetermined driving signal; and pulse modulation means for generating a modulation pulse for modulating said predetermined driving signal in response to said predetermined pilot signal, thereby providing said predetermined modulated driving signal to said laser diode.

12. The interferometric temperature sensing system as claimed in claim 11, wherein said temperature processing means comprise:

control signal generation means for generating a reference frequency of a predetermined period and said predetermined pilot signal in dependence upon said reference frequency, said control signal generation means further generating a sampling frequency by delaying said reference frequency by a predetermined amount, and supplying said sampling frequency, an average control signal and a transmission control signal in response to said predetermined pilot signal and said sampling frequency;

analog-to-digital conversion means for digitally-converting said sense signal in response to said sampling frequency;

first transmission means for latching and transmitting data within a predetermined period corresponding to a first portion of said sampling frequency among data sequentially supplied from said analog-to-digital conversion means in response to said transmission control signal;

second transmission means for averaging data within a predetermined period corresponding to other portions of said sampling frequency except said first portion among said data sequentially supplied from said analog-to-digital conversion means in response to said average control signal, to supply an average value of said data;

fringe pulse generation means for comparing a voltage indicated by said sense signal with predetermined reference voltage to generate a fringe pulse when said voltage indicated by said sense signal is greater than said reference voltage;

fringe pulse counting means for one of counting up and counting down said fringe pulse in response to a direction determination signal; and temperature calculation means for determining a direction of temperature change by analyzing the data and average value respectively supplied from said first and second transmission means in response to said transmission control signal, said temperature calculation means supplying said direction determination signal to said fringe pulse counting means in dependence upon said determined direction of temperature change while simultaneously, calculating a magnitude of temperature change in response to an output supplied from said fringe pulse counting means.

13. An interferometric temperature sensing system having a coupled laser diode, said system comprising:

optical transmission means having first and second ends, for reflecting on said second end a first laser beam propagated from said first end to produce a primary reflected laser beam, said optical transmission means coupling said primary reflected laser beam and a secondary reflected laser beam propagated to said second end into a coupled laser beam including an interference fringe pattern caused by a phase difference between said primary and secondary reflected laser beams, said coupled laser beam being transmitted to said first end of said optical transmission means;

interferometric sensing means for varying an optical path in response to an environmental temperature, said interferometric sensing means having a first end connected to said second end of said optical transmission means for feeding back said secondary reflected laser beam to said second end of said optical transmission means through said varying optical path;

laser detection means for emitting said first laser beam in response to a modulated driving signal, and adjusting a magnitude of said first laser beam in dependence upon a magnitude of a prior coupled beam transmitted to said first end of said optical transmission means, said laser detection means generating a sense signal indicative of temperature information in dependence upon a degree of adjustment of the magnitude of said first laser beam;

modulated signal generation means for generating said modulated driving signal in response to a predetermined pilot signal; and temperature processing means for generating said predetermined pilot signal, and for amplifying, filtering and processing said sense signal to convert said sense signal into an indicated temperature.

14. The interferometric temperature sensing system as claimed in claim 13, wherein said optical transmission means comprise a single-mode optical fiber.

15. The interferometric temperature sensing system as claimed in claim 14, wherein said laser detection means comprise:

a laser diode for propagating said first laser beam to said second end of said single-mode optical fiber in response to said modulated driving signal, and adjusting the magnitude of said first laser beam corresponding to the magnitude of said prior coupled beam; and a photo diode for convening the degree of adjustment of the magnitude of said first laser beam into said sense signal indicative of said temperature information, said laser diode and said photo diode being included together in a single package.

16. The interferometric temperature sensing system as claimed in claim 15, further comprising optical coupling means for optically coupling said first laser beam propagated from said laser diode to said first end of said single-mode optical fiber, and optically coupling said coupled laser beam fed back through said first end of said single-mode optical fiber to said laser diode.

17. The interferometric temperature sensing system as claimed in claim 16, wherein said optical coupling means comprise a lens.

18. The interferometric temperature sensing system as claimed in claim 16, wherein said interferometric sensing means comprise a Fabry-Perot sensor.

19. The interferometric temperature sensing system as claimed in claim 18, wherein said Fabry-Perot sensor comprises:

reflecting means for reflecting light, said reflecting means positioned at a second end of said interferometric sensing means opposite said first end; and an optical fiber having first and second ends for propagating said first laser beam without said primary reflected laser beam from said first end of said interferometric sensing means to said reflecting means, and feeding back said secondary reflected laser beam reflected from said reflecting means to said first end of said interferometric sensing means, said first and second ends of said optical fiber corresponding to said first and second ends of said interferometric sensing means, respectively.

20. The interferometric temperature sensing system as claimed in claim 19, wherein said reflecting means comprise a dielectric material having a high reflection factor and is positioned on said second end of said optical fiber.

21. The interferometric temperature sensing system as claimed in claim 19, wherein said reflecting means comprise a metallic material having a high reflection factor and is positioned on said second end of said optical fiber.

22. The interferometric temperature sensing system as claimed in claim 19, wherein said first end of said optical fiber is coated with dielectric materials and is butt-coupled to said second end of said single-mode optical fiber.

23. The interferometric temperature sensing system as claimed in claim 19, wherein said first end of said optical fiber is fusion-spliced to said second end of said single-mode optical fiber.

24. The interferometric temperature sensing system as claimed in claim 19, wherein said modulated signal generation means comprise:

driving means for generating a predetermined driving signal; and pulse modulation means for generating a modulation pulse for modulating said predetermined driving signal in response to said predetermined pilot signal, thereby providing said modulated driving signal to said laser diode.

25. The interferometric temperature sensing system as claimed in claim 24, wherein said temperature processing means comprise:

control signal generation means for generating a reference frequency of a predetermined period and said predetermined pilot signal in dependence upon said reference frequency, said control signal generation means further generating a sampling frequency by delaying by said reference frequency by a predetermined amount, and supplying said sampling frequency, an average control signal and a transmission control signal in response to said predetermined pilot signal and said sampling frequency;

analog-to-digital conversion means for digitally-convening said sense signal in response to said sampling frequency;

first transmission means for latching and transmitting data within a predetermined period corresponding to a first portion of said sampling frequency among data sequentially supplied from said analog-to-digital conversion means in response to said transmission control signal;

second transmission means for averaging data within a predetermined period corresponding to other portions of said sampling frequency except said first portion among said data sequentially supplied from said analog-to-digital conversion means in response to said average control signal;

fringe pulse generation means for comparing a voltage indicated by said sense signal with a predetermined reference voltage to generate a fringe pulse when said voltage indicated by said sense signal is greater than said reference voltage;

fringe pulse counting means for one of counting up and counting down said fringe pulse in response to a direction determination signal; and temperature calculation means for determining a direction of temperature change by analyzing the data and average value respectively supplied from said first and second transmission means in response to said transmission control signal, said temperature calculation means supplying said direction determination signal to said fringe pulse counting means in dependence upon said determined direction of temperature change while simultaneously, calculating a magnitude of temperature change in response to an output supplied from said fringe pulse counting means.

26. The interferometric temperature sensing system as claimed in claim 25, wherein said temperature processing means further comprises pre-amplification means positioned between said photo diode and said analog-to-digital conversion means for pre-amplifying said sense signal.

27. The interferometric temperature sensing system as claimed in claim 26, wherein said temperature processing means further comprise noise elimination means for removing noise caused by optical feed-back included in said sense signal.

28. An interferometric temperature sensing system having a coupled laser diode, said system comprising:

optical coupling transmission means having first and second ends, for propagating a first laser beam from said first end to said second end, said optical transmission means coupling a primary reflected laser beam and a secondary reflected laser beam into a combined laser beam including an interference fringe pattern caused by a phase difference between said primary and secondary reflected laser beams, said combined laser beam being transmitted to said first end of said optical coupling transmission means;

interferometric sensing means having first and second ends, for varying an optical path in response to an environmental temperature, said first end of said interferometric sensing means being connected to said second end of said optical coupling transmission means, said interferometric sensing means producing said primary reflected laser beam by reflecting a first portion of said first laser beam at said first end of said interferometric sensing means, said interferometric sensing means further producing said secondary reflected laser beam by reflecting a second portion of said first laser beam on said second end of said interferometric sensing means, said second portion of said first laser beam being a portion of said first laser beam that is not reflected during the production of said primary reflected laser beam, said interferometric sensing means feeding back said primary and secondary reflected laser beams to said second end of said optical coupling transmission means through said varying optical path;

laser detection means for emitting said first laser beam in response to a modulated driving signal, and adjusting a magnitude of said first laser beam in dependence upon a magnitude of a prior combined laser beam fed back through said optically coupling transmission means, said laser detection means generating a sense signal indicative of temperature information in dependence upon a degree of adjustment of the magnitude of said first laser beam;

modulated signal generation means for generating said modulated driving signal in response to a pilot signal; and temperature processing means for generating said pilot signal, and converting said sense signal into an indicated temperature.

29. The interferometric temperature sensing system having a coupled laser diode as claimed in claim 28, wherein said laser detection means comprise:

a laser diode for propagating said first laser beam to said second end of said optical coupling transmission means and for adjusting the magnitude of said first laser beam corresponding to the magnitude of said prior combined laser beam; and a photo diode for convening the degree of adjustment of the magnitude of said first laser beam into said sense signal indicative of said temperature information, said laser diode and said photo diode being included together in a single package.

30. The interferometric temperature sensing system having a coupled laser diode as claimed in claim 29, wherein said optical coupling transmission means comprise:

a single-mode optical fiber for transmitting said first laser beam to said first end of said interferometric sensing means, coupling said primary and secondary reflected laser beams into said combined laser beam including said interference fringe pattern caused by said phase difference between said primary and secondary reflected laser beams, and then transmitting said combined laser beam to said laser diode; and a lens for optically coupling said first laser beam propagated from said laser diode to said first end of said single-mode optical fiber, and optically coupling said combined laser beam fed back through said first end of said single-mode optical fiber to said laser diode.

31. The interferometric temperature sensing system having a coupled laser diode as claimed in claim 30, wherein said interferometric sensing means comprise:

an optical fiber extending between said first and second ends of said interferometric sensing means, said optical fiber having first and second ends corresponding to said first and second ends of said interferometric sensing means, respectively, said optical fiber having a refractive index different from said single-mode optical fiber, for reflecting said first portion of said first laser beam propagated through said second end of said single-mode optical fiber according to different refractive indices of said optical fiber and said single-mode optical fiber; and total reflection means positioned on said second end of said interferometric sensing means for reflecting said second portion of said first laser beam back to said first end of said interferometric sensing means.

32. The interferometric temperature sensing system having a coupled laser diode as claimed in claim 31, wherein said reflection means comprise a dielectric material having a high reflection factor, said reflection means positioned on said second end of said optical fiber.

33. The interferometric temperature sensing system having a coupled laser diode as claimed in claim 31, wherein said reflection means comprise a metallic material having a high reflection factor, said reflection means being fusion-spliced on said second end of said optical fiber.

34. The interferometric temperature sensing system having a coupled laser diode as claimed in claim 31, wherein said modulated signal generation means comprises:

driving means for generating a predetermined driving signal; and pulse modulation means for generating a modulation pulse for modulating said predetermined driving signal in response to said pilot signal, thereby providing said modulated driving signal to said laser diode.

35. The interferometric temperature sensing system having a coupled laser diode as claimed in claim 34, wherein said temperature processing means comprises:

control signal generation means for generating a reference frequency of a predetermined period and said pilot signal in dependence upon said reference frequency, said control signal generation means further generating a sampling frequency by delaying said reference frequency by a predetermined amount, and supplying said sampling frequency, an average control signal and a transmission control signal in response to said pilot signal and said sampling frequency;

analog-to-digital conversion means for digitally-convening said sense signal in response to said sampling frequency;

first transmission means for latching and transmitting data within a predetermined period corresponding to a first portion of said sampling frequency among data sequentially supplied from said analog-to-digital conversion means in response to said transmission control signal;

second transmission means for averaging data within a predetermined period corresponding to other portions of said sampling frequency except said first portion among data sequentially supplied from said analog-to-digital conversion means in response to said average control signal;

fringe pulse generation means for comparing a voltage indicated by said sense signal with a predetermined reference voltage to generate a fringe pulse when said voltage indicated by said sense signal is greater than said reference voltage;

fringe pulse counting means for one of counting up and counting down said fringe pulse in response to input of a direction determination signal; and temperature calculation means for determining a direction of temperature change by analyzing the data and average value respectively supplied from said first and second transmission means in response to said transmission control signal, said temperature calculation means supplying said direction determination signal to said fringe pulse counting means in dependence upon said determined direction of temperature change while simultaneously, calculating a magnitude of temperature change in response to an output provided from said fringe pulse counting means.

36. The interferometric temperature sensing system having a coupled laser diode as claimed in claim 35, wherein said control signal generation means comprises:

oscillation means for generating said reference frequency of said predetermined period;

pilot signal generation means for generating said pilot signal in dependence upon said reference frequency, said pilot signal having a period represented by an initial portion of said predetermined period of said reference frequency;

delay means for delaying said reference frequency by a predetermined amount to generate said sampling frequency; and data selection means for generating said sampling frequency signal, said average control signal and said transmission control signal in response to said pilot signal and said sampling frequency.

37. The interferometric temperature sensing system having a coupled laser diode as claimed in claim 36, further comprising an amplifier positioned between said photo diode and said analog-to-digital conversion means, for amplifying said sense signal to a predetermined level.

38. The interferometric temperature sensing system having a coupled laser diode as claimed in claim 36, wherein said second transmission means comprises:

a buffer for sequentially latching and transmitting data corresponding to the other portions of said sampling frequency except said first portion among data sequentially supplied from said analog-to-digital conversion means in response to an input of said average control signal; and a line averager for averaging the data sequentially transmitted from said buffer to supply said average value to said temperature calculation means.

* * * * *